No. 724,838. PATENTED APR. 7, 1903.
S. E. FISH.
DENTAL APPLIANCE.
APPLICATION FILED NOV. 25, 1902.
NO MODEL.

Witnesses:
William Shaw
James McLane

Inventor:
Sidell E. Fish
By C. L. Horack
Attorney.

UNITED STATES PATENT OFFICE.

SIDELL E. FISH, OF GREENPORT, NEW YORK.

DENTAL APPLIANCE.

SPECIFICATION forming part of Letters Patent No. 724,838, dated April 7, 1903.

Application filed November 25, 1902. Serial No. 132,734. (No model.)

*To all whom it may concern:*

Be it known that I, SIDELL E. FISH, a citizen of the United States, residing at Greenport, Suffolk county, State of New York, have invented certain new and useful Improvements in Disks and Disk-Holders, of which the following is a specification.

My invention refers to dental appliances, and more particularly to means for attaching dental disks used for polishing teeth and the fillings of teeth to the revolving shafts of dental engines, which means or appliances are commonly designated as "dental disk-mandrels."

Dental disks are usually made of paper covered with a suitable coating comprising emery or the like and have heretofore generally been provided with a central circular perforation fitting a shank detachably connected with the revolving shaft of a dental engine and have been held against a shoulder on said shank by devices depending upon frictional engagement between portions of the mandrel or by screw-thread.

The objects of my invention are to so construct the portions of a dental disk-mandrel which serve to confine the dental disk in its operative position as to secure locking contact and engagement between the same while holding said disk in place and to permit of promptly and easily attaching a disk to said mandrel and of detaching it therefrom. I accomplish these and other useful objects by the means hereinafter described, and set forth more particularly in the claims.

Figure 1:
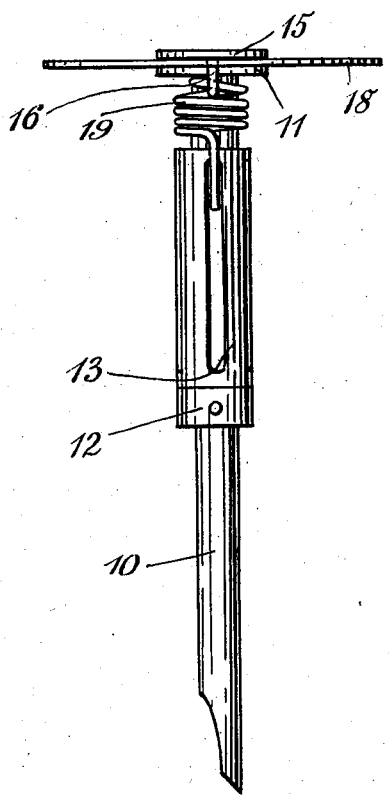
Figure 2:
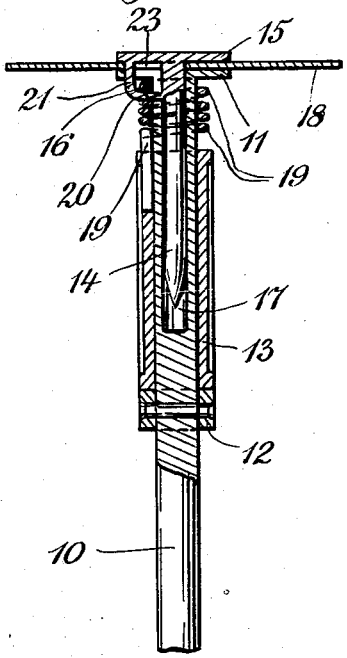
Figure 3:
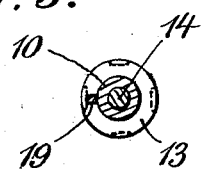

In the accompanying drawings, wherein corresponding reference-figures refer to corresponding parts, Figure 1 is a side view of a dental appliance comprising a disk-mandrel and a dental disk, all constructed according to my invention, while Fig. 2 is a longitudinal section thereof. Fig. 3 is an end view, partly in section, of a portion of the mandrel and of connecting parts; and Fig. 4, a face view of a dental disk adapted to be used in connection with my improved dental appliance.

In the drawings, 10 is a shank capable of being attached at one end to the revolving shaft of a dental engine and having fixedly secured to its other end a metal disk 11.

12 is a collar riveted to the central portion of said shank.

13 is a sleeve revolubly mounted upon said shank between disk 11 and collar 12.

14 is a pointed stud provided with a head 15 and an eye 16, made of thin wire and placed close to and connecting with said head and so extending along said stud as to place said eye substantially in the central longitudinal plane of said stud. Said stud fits into and is adapted to be inserted in a longitudinal perforation 17 within shank 10 in such manner that thereby a dental disk 18 may be confined between disk 11 and head 15.

19 is a spiral spring having one end fixedly attached to sleeve 13 and being coiled around the portion of shank 10 between sleeve 13 and disk 11, so as to bring its free end adjacent to said disk. It is coiled loosely, so as to permit of its being forced to some extent toward said sleeve. Disk 11 is so perforated as to permit of forcing through it stud 14 and eye 16 as said stud is being inserted in shank 10 after first placing dental disk 18 between head 15 and said disk.

I apply my dental disk and I insert stud 14 in perforation 17 while the shaft of the engine, and with it disk 11, is revolving, pressing head 15 toward disk 11 until eye 16 passes through the perforation in said disk and comes to rest against the end coil of spring 19 and depresses the latter until the free end of the coil finally passes into eye 16 and draws the eye, and with it head 15, toward disk 11, whereby, owing to the elasticity of said spring, head 15 is finally firmly secured in a position closely adjoining dental disk 18, so as to hold the latter in its operative position and in contact with disk 11. It will thus be seen that the free end of spring 19 forms a yielding arm movable with reference to the shank and which in passing through eye 16 draws said eye, and with it head 15, toward sleeve 13 and locks said head in its proper position in close contact with the dental disk and that such locking operation will thus be performed no matter what be the thickness of said dental disk. It will also be observed that the portion 20 of eye 16 which runs substantially parallel with head 15 locks with spring 19, while portion 21 of said eye serves to reinforce portion 20 and also in passing through dental disk 18 while the latter is confined between parts 11 and 15 serves to further steady said disk and prevent it from revolving around stud 14.

Figure 4:
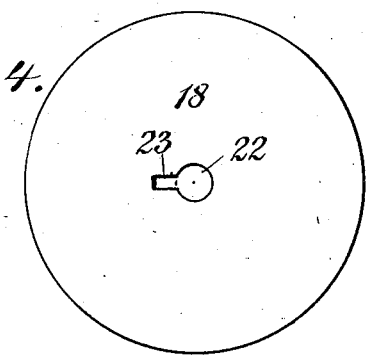

While eye 16 might be permitted to enforce its passage through dental disk 18 while stud 14 is entering perforation 17, I prefer to originally construct said disk with a perforation, as shown more particularly in Fig. 4, which comprises a circular hole 22, fitting stud 14, and in addition a slit 23, communicating with said circular perforation and fitting part 20 of eye 16 and said eye in general. I thus avoid the formation of a bur on disk 18, which might interfere with properly confining it in its place.

By having the perforation in the disk so shaped before applying it to the disk-holder as to conform with stud 14 and eye 16 even slight revolving of the disk around said stud will be guarded against.

It will readily be seen that the details of my improved dental appliance might be varied in many respects without departing from the spirit of my invention, and I therefore do not wish to confine myself to the details above described.

When the dental disk is to be detached from the mandrel, this can be done by holding sleeve 13 in one hand and reversing the direction of the revolution of the dental shaft, whereby spring 19 will become disengaged from eye 16, so as to permit of withdrawing stud 14 from socket 17, and consequently freeing disk 18 from its engagement with disk 11 and head 15.

I claim—

1. In a dental disk-mandrel, the combination with a shank adapted to be attached to the shaft of a dental engine, of a stud having a suitable head and adapted to be inserted in said shank and to be entirely detached therefrom, a projection on said stud, and a locking-arm attached to and capable of moving with reference to the shank and adjusted to engage with said projection.

2. In a dental disk-mandrel, the combination with a shank adapted to be attached to the shaft of a dental engine of a stud with suitable head and adapted to be inserted in said shank, a projection on said stud, and an elastic locking-arm adjusted to be brought in locking contact with said projection during revolution of said shank with reference to said stud.

3. In a dental disk-mandrel, the combination with a shank adapted to be attached to the shaft of a dental engine, of a stud having a suitable head and adapted to be inserted in said shank, a projection on said stud and a locking-arm attached to and capable of moving with reference to the shank and adjusted to successively engage with opposite surfaces of said projection during revolution of said shank with reference to said stud and while the stud is being inserted into said shank.

4. In a dental disk-mandrel, the combination with a shank adapted to be attached to the shaft of a dental engine, of a stud with suitable head and adapted to be inserted in said shank, a projection on said stud, and a spiral spring adapted to engage with said projection.

In testimony whereof I have signed my name to this specification, in the presence of two subscribing witnesses, this 21st day of November, 1902.

SIDELL E. FISH.

Witnesses:
　CHAS. L. HORACK,
　EDWARD A. PEIRCE.